United States Patent [19]

Tanaka

[11] Patent Number: 5,138,441
[45] Date of Patent: Aug. 11, 1992

[54] BEAM-INDEX-TYPE COLOR DISPLAY APPARATUS

[75] Inventor: Satoru Tanaka, Tsurugashima, Japan

[73] Assignee: Pioneer Electronic Corporation, Tokyo, Japan

[21] Appl. No.: 498,136

[22] Filed: Mar. 23, 1990

[30] Foreign Application Priority Data

Jul. 7, 1989 [JP] Japan .................................. 1-176491

[51] Int. Cl.⁵ .......................... H04N 9/31; H04N 5/74
[52] U.S. Cl. ........................................ 358/60; 358/56; 358/231
[58] Field of Search ................ 353/122; 313/471, 409, 313/412; 340/795, 796; 358/58, 59, 66, 231, 239, 232, 60, 61, 62, 63, 67, 205, 206, 207, 199, 56, 68, 69, 10; 350/117

[56] References Cited

U.S. PATENT DOCUMENTS

| | | | |
|---|---|---|---|
| 3,465,352 | 9/1969 | Carlson et al. | 358/231 |
| 3,967,315 | 6/1976 | Goodman | 358/67 |
| 4,259,687 | 3/1981 | Shinkai et al. | 358/69 |
| 4,684,996 | 8/1987 | Baumeister | 358/69 |
| 4,868,668 | 9/1989 | Tavernetti | 358/60 |
| 4,979,030 | 12/1990 | Murata | 358/60 |
| 4,992,858 | 2/1991 | Kobayashi | 358/63 |
| 5,051,834 | 9/1991 | Matui | 358/231 |

FOREIGN PATENT DOCUMENTS 61-61315 12/1986 Japan .

*Primary Examiner*—Alvin E. Oberley
*Assistant Examiner*—Steve Saras
*Attorney, Agent, or Firm*—Sughrue, Mion, Zinn, Macpeak & Seas

[57] ABSTRACT

A beam-index-type color display apparatus includes an A/O modulator for emitting a first-order beam for use as an image projecting light beam and a zero-order beam for use as an index beam. The color display apparatus is light-weight and may have a large screen. An index signal can reliably be produced even if the screen is treated for a higher screen gain.

3 Claims, 2 Drawing Sheets

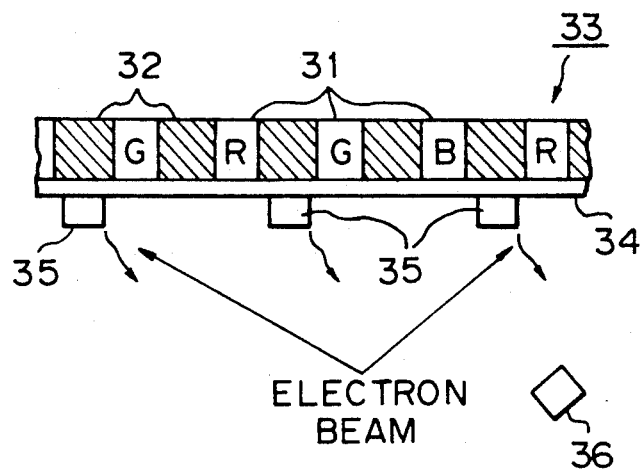
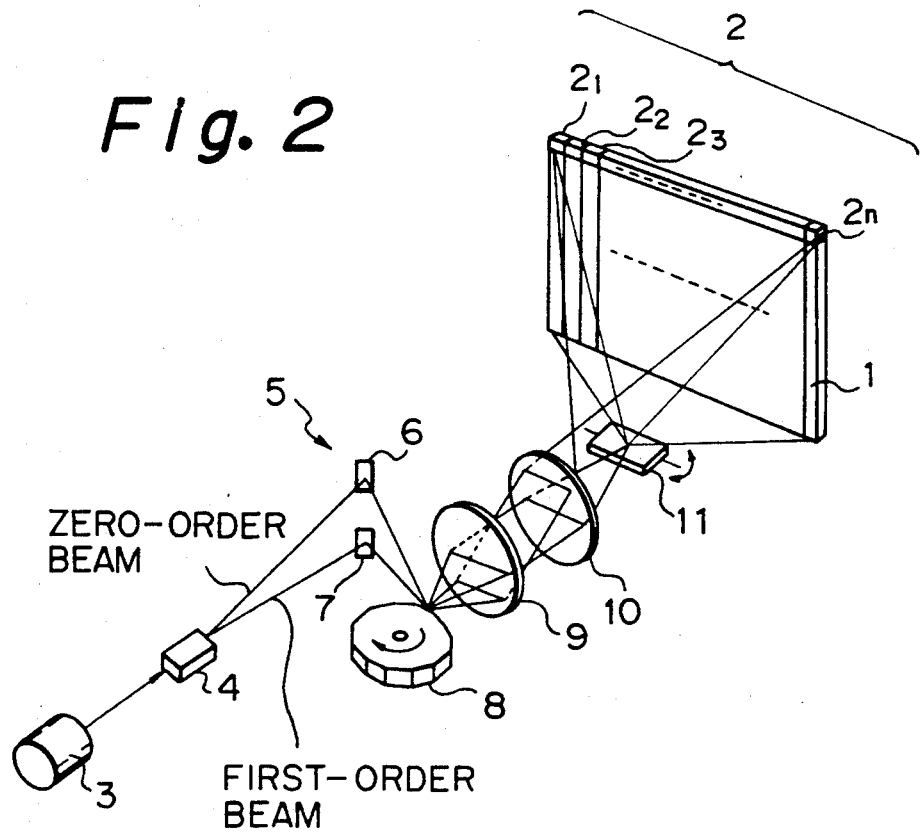

BEAM-INDEX-TYPE COLOR DISPLAY APPARATUS

BACKGROUND OF THE INVENTION

1. Field of the Invention

The present invention relates to a beam-index-type color display apparatus.

2. Description of the Related Art

There is known a beam-index-type color display apparatus which has no shadow mask. Such a beam-index-type color display apparatus comprises a two-dimensional screen composed of fluorescent stripes of three primaries, i.e., R (red), G (green), and B (blue), the fluorescent stripes being arranged at regular intervals in a horizontal scanning direction. Since the two-dimensional screen is scanned with a single electron beam, it is necessary to detect the horizontally scanning spot of the electron beam and feed back a signal indicative of the horizontally scanning spot in order to excite the fluorescent stripes in exactly timed relation to the light beam.

One conventional color display apparatus which has been proposed to meet the above requirement is shown in FIG. 1 of the accompanying drawings (see Japanese Patent Publication No. 61-61315). The known color display apparatus has a two-dimensional screen 33 which comprises fluorescent stripes 31 of R, G, B arranged at regular intervals in a horizontal scanning direction, and black stripes 32 each disposed between adjacent two of the fluorescent stripes 31, the black stripes 32 being made of a black light-shielding material. A metal backing layer 34 of aluminum is disposed over the entire surface of the screen 33. Index fluorescent stripes 35 are mounted on the metal backing layer 34 and spaced in the horizontal scanning direction at intervals or a pitch equal to ⅔, for example, of the pitch of one set of R, G, B fluorescent stripes 31. When the screen 33 is horizontally scanned with a single electron beam, the electron beam is applied to the fluorescent stripes 35 successively, which are then excited. The excited fluorescent stripes 35 emit light that is detected by a light detector 36 which then generates a signal to be fed back for synchronizing purpose.

The prior color display apparatus of the beam index type requires a vacuum system for generating an electron beam to scan the two-dimensional screen 33. Therefore, the color display apparatus is relatively heavy. Since the electron gun for emitting the electron beam and the screen 33 are positionally fixed with respect to each other, the size of the screen 33 cannot be altered, particularly, it cannot be increased.

SUMMARY OF THE INVENTION

It is an object of the present invention to provide a beam-index-type color display system which is relatively lightweight, has a screen that can easily be altered in size, and can suitably be arranged to provide a large screen.

According to the present invention, a beam-index-type color display apparatus comprises a two-dimensional screen which is composed of fluorescent stripes of three primaries which are sensitive to a light beam, the fluorescent stripes being arranged at regular intervals in the horizontal scanning direction. The color display apparatus also includes an array of light detectors arranged at regular intervals in the horizontal scanning direction and disposed on the respective longitudinal ends of the fluorescent stripes. The intensity of an applied light beam is modulated by a modulating signal in synchronism with the horizontal scanning timing of the light beam which is produced from a detected output of the light detectors. A first-order beam which is modulated is applied to the screen to scan the same in horizontal and vertical scanning directions. At the same time, the light detectors are scanned along the array thereof with a zero-order beam in synchronism with the horizontal scanning of the screen with the first-order beam.

The modulated first-order beam is used as an image projecting beam, whereas the zero-order beam which is not employed as the image projecting beam is effectively utilized as an index beam.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a fragmentary plan view of a two-dimensional screen of a conventional beam-index-type color display apparatus which employs a vacuum system for generating an electron beam;

FIG. 2 is a schematic perspective view of a beam-index-type color display apparatus according to the present invention.

DETAILED DESCRIPTION OF THE PREFERRED EMBODIMENT

Figure 3:
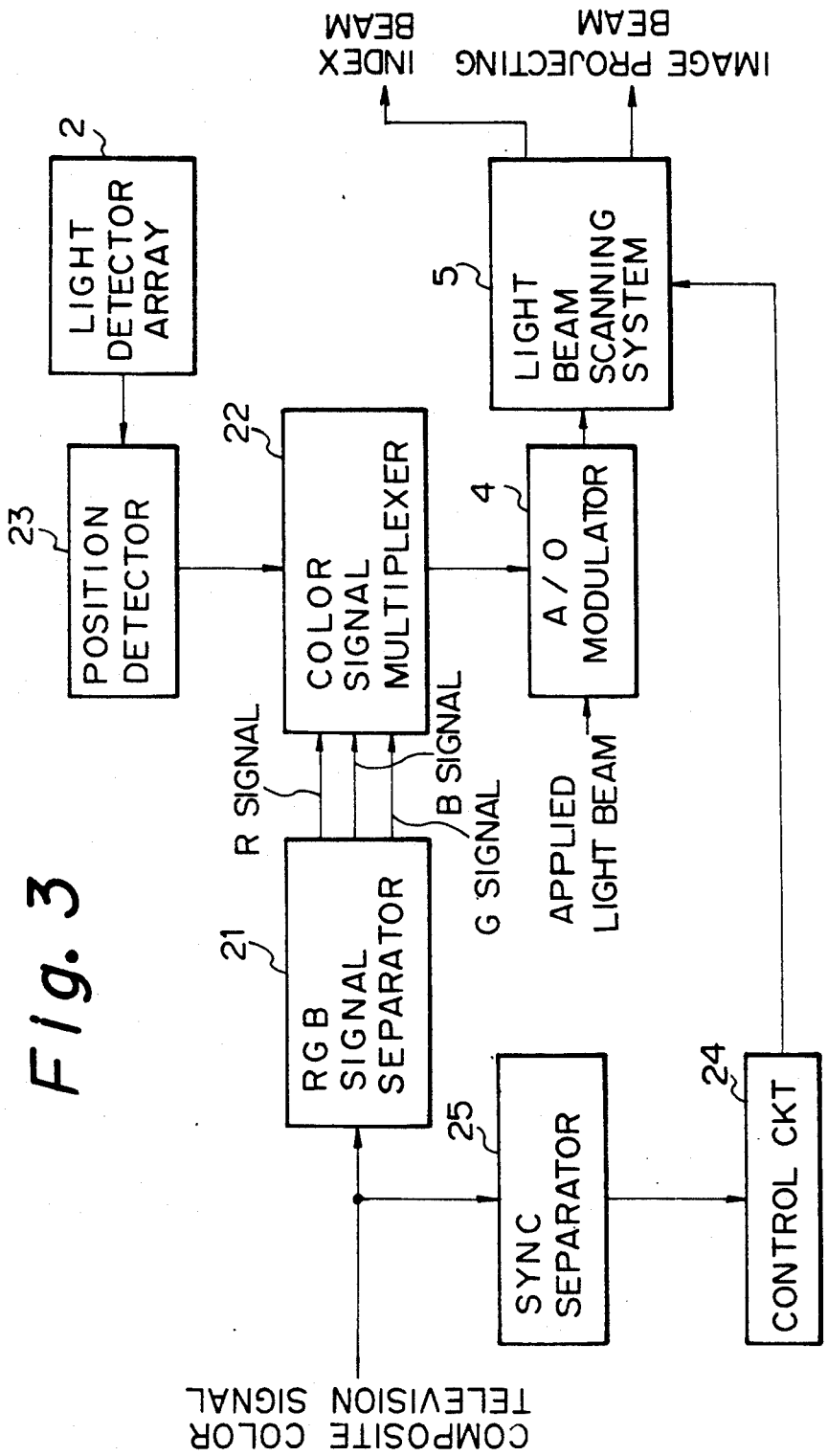
FIG. 3 is a block diagram of a control system for the beam-index-type color display apparatus of the invention.

FIG. 2 schematically shows a beam-index-type color display apparatus according to the present invention. The beam-index-type color display apparatus comprises a two-dimensional screen 1 which is composed of light-emitting stripes, e.g., fluorescent stripes, of R, G, B which are sensitive to an exciting light beam such as an ultraviolet radiation. The fluorescent stripes are arranged at regular intervals in a horizontal scanning direction and joined together by a relatively transparent binder of acrylic resin or the like. One set of three adjacent fluorescent stripes of R, G, B forms a unit pixel in the horizontal scanning direction. An array 2 of light detectors $2_1, 2_2, 2_3, \ldots, 2_n$ is mounted on the upper longitudinal ends of the fluorescent stripes of the screen 1, the light detectors being arranged in the horizontal scanning direction and aligned with the respective fluorescent stripes. The light detector array 2 may be mounted on the lower longitudinal ends of the fluorescent stripes. The light detectors of the array 2 may not necessarily be associated with the respective fluorescent stripes, but may be spaced at a pitch which is n times (n is an integer) the pitch of the fluorescent stripes.

A laser beam emitted from a laser beam source 3 is applied to an acoustooptic (A/O) modulator 4. The A/O modulator 4 modulates the intensity of the applied laser beam with a modulating signal in the form of a time-division color signal composed of three-primary signals representative of the colors of the unit pixels, for example. The A/O modulator 4 divides the applied laser beam into a zero-order beam and a first-order beam according to Bragg diffraction. The zero-order beam is attenuated in intensity into an index beam which is introduced into a light beam scanning system 5. Since the first-order beam has a higher extinction ratio than the zero-order beam, the first-order beam is introduced as an image projecting beam into the light beam scanning system 5. The extinction ratio referred to above is the ratio Imin/Imax (or its reciprocal) of a minimum value Imin to a maximum value Imax which can be assumed by the intensity of an output light beam which is modulated.

In the light beam scanning system 5, the zero- and first-order beams are reflected by respective reflecting mirrors 6, 7 and applied to a rotating polygon 8. If the position where the zero-order beam is applied to the rotating polygon 8 in the direction in which it is rotated is the same as the position where the first-order beam or the image projecting beam is applied to the rotating polygon 8, then the zero-order beam can be used as an index beam. The rotating polygon 8 is rotated in synchronism with a horizontal synchronizing signal of a composite color television signal for thereby deflecting the applied beams in the horizontal scanning direction. The first-order beam deflected by the rotating polygon 8 is applied through a pair of relay lenses 9, 10 to a galvanometer mirror 11. The galvanometer mirror 11 is angularly moved back and forth in synchronism with a vertical synchronizing signal of the composite color television signal for thereby deflecting the applied beam in a vertical scanning direction.

The zero-order beam deflected by the rotating polygon 8 passes through the relay lenses 9, 10, and is applied as the index beam directly to the light detector array 2 on the upper end of the screen 1. The angle of incidence of the zero-order beam upon the light detector array 2 is determined by the angle of incidence of the zero-order beam upon the rotating polygon 8. The light detector array 2 successively detects the zero-order beam which is applied thereto while being scanned horizontally, and supplies a detected signal as an index signal to a position detector 23 shown in FIG. 3.

The reflecting mirror 7, the rotating polygon 8, the relay lenses 9, 10, and the galvanometer mirror 11 jointly serve as a first scanning means for two-dimensionally scanning the screen 1 in the horizontal and vertical scanning directions. The reflecting mirror 6, the rotating polygon 8, and the relay lenses 9, 10 jointly serve as a second scanning means for scanning the light detector array 2 in its longitudinal direction (i.e., the horizontal scanning direction).

FIG. 3 shows in block form a control system of the beam-index-type color display apparatus. Those parts shown in FIG. 3 which are equivalent to those shown in FIG. 2 are denoted by identical reference numerals. The A/O modulator 4 is supplied with R, G, B signals, representative of the colors of the unit pixels and separated from a composite color television signal by an RGB signal separator 21, as a time-division color signal composed of a series of such R, G, B signals, from a color signal multiplexer 22. The A/O modulator 4 then modulates the intensity of the applied laser beam with the supplied time-division color signal. The color signal multiplexer 22 is controlled in its timing of operation by the position detector 23 which detects the horizontally scanning spot of the image projecting beam on the screen 1 based on the index signal from the light detector array 2, so that the color signal multiplexer 22 converts the R, G, B signals into the time-division color signal which is composed of a series of such R, G, B signals.

The light beam scanning system 5 is controlled by a control circuit 24 in synchronism with the horizontal and vertical synchronizing signals which are separated from the composite color television signal by a synchronizing separator 25, for thereby deflecting the light beam in the horizontal and vertical scanning directions on the two-dimensional screen 1. The two-dimensional screen 1 is scanned with the light beam that is two-dimensionally deflected by the light beam scanning system 5, in synchronism with changes in the intensity and colors of the light beam, so that an image is projected or displayed on the screen 1.

Since the light beam is employed as the image projecting beam, no heavy vacuum system which would otherwise is used to generate an electron beam is required, and hence the color display apparatus is lightweight. The position of the screen 1 with respect to the light beam scanning system 5 can be varied or adjusted, with the result that the size of the screen 1 can easily be altered, and particularly a large-size screen can be employed in the color display apparatus.

The zero-order beam which is not employed as the image projecting beam is effectively utilized a the index beam. Even if the screen 1 is treated or specially designed for a higher screen gain, the index signal can be generated effectively without being influenced by such a special effect of the screen 1.

The arrangement of the light beam scanning system 5 shown in FIG. 2 is shown by way of illustrative example only, and the light beam scanning system 5 is not limited to the illustrated structure. For example, the relay lenses 9, 10 are employed to reduce the size of the rotating polygon 8 in the illustrated design, and hence may be dispensed with.

With the present invention, as described above, the beam-index-type color display apparatus comprises a two-dimensional screen which is composed of fluorescent stripes of three primaries which are sensitive to a light beam, the fluorescent stripes being arranged at regular intervals in the horizontal scanning direction. The color display apparatus also includes an array of light detectors arranged at regular intervals in the horizontal scanning direction and disposed on the respective longitudinal ends of the fluorescent stripes. The intensity of an applied light beam is modulated by a modulating signal in synchronism with the horizontal scanning timing of the light beam which is produced from a detected output of the light detectors. A first-order beam which is modulated is applied to the screen to scan the same in horizontal and vertical scanning directions. At the same time, the light detectors are scanned along the array thereof with a zero-order beam in synchronism with the horizontal scanning of the screen with the first-order beam.

Because no heavy vacuum system is needed, the overall color display apparatus is reduced in weight, the size of the screen can easily be altered, and the color display apparatus can employ a large screen. The zero-order beam is utilized as an index beam. Therefore, even if the screen is treated or specially designed for a higher screen gain, the index signal can be generated effectively without being influenced by such a special effect of the screen.

Although a certain preferred embodiment has been shown and described, it should be understood that many changes and modifications may be made therein without departing from the scope of the appended claims.

What is claimed is:

1. A beam-index-type color display apparatus comprising:
    a screen composed of a plurality of fluorescent stripes of three primaries which are sensitive to a light beam, said fluorescent stripes being arranged with a regular pitch in a horizontal scanning direction;
    an array of light detectors arranged with a given pitch in the horizontal scanning direction and disposed on respective longitudinal ends of said fluorescent stripes;
    light modulating means for modulating the intensity of an applied light beam with a modulating signal in synchronism with the horizontal scanning timing of the light beam which is produced from a detected output of said light detectors;
    first scanning means for scanning said screen in the horizontal and vertical scanning directions with a first-order beam emitted from said light modulating means as an image projecting beam; and
    second scanning means for scanning said light detectors along the array thereof with a zero-order beam emitted from said light modulating means in synchronism with the scanning of said screen with said first-order beam in the horizontal scanning direction as an index beam.

2. A beam-index-type color display apparatus according to claim 1, wherein said given pitch is n times (n is an integer) of said regular pitch with which said fluorescent stripes are arranged.

3. An apparatus as claimed in claim 1, wherein said first scanning means and said second scanning means share substantially the same optical elements in order to reduce the total number of optical elements.

* * * * *